UNITED STATES PATENT OFFICE.

LEWIS J. BENNETT, OF BUFFALO, NEW YORK.

PROCESS OF OBTAINING THE GLUTINOUS AND STARCHY SUBSTANCES FROM INDIAN CORN.

SPECIFICATION forming part of Letters Patent No. 230,991, dated August 10, 1880.

Application filed February 6, 1880.

*To all whom it may concern:*

Be it known that I, LEWIS J. BENNETT, of the city of Buffalo, in the county of Erie and State of New York, have invented a new and useful Improvement in Process for Obtaining the Glutinous and Starchy Substances from Indian Corn or Maize, of which the following is a specification.

This invention relates to a method or process of treating Indian corn or maize whereby the glutinous matter contained in the corn is separated from the starchy matter in a dry state, thereby permitting each to be treated separately and advantageously with reference to the ultimate product which is desired to be manufactured.

Heretofore corn has been reduced for the purpose of obtaining the glutinous and starchy matter contained in the corn by grinding it between suitable stones either in a wet or dry state. By grinding the corn in a wet state a large quantity of wet offal is produced which is of small commercial value, as it cannot be kept for any considerable length of time, and because it cannot be profitably shipped to any considerable distance on account of the large quantity of moisture which it contains. By grinding the corn in a dry state a considerable portion of the glutinous matter contained in the kernels of corn is reduced to flour and mixed with the starch-flour, and the latter is smeared over the fragments of glutinous matter, thereby rendering it impossible to effect a complete separation of the glutinous from the starchy matter in a dry state.

The object of my invention is to treat the corn in such a manner that a complete separation of the two substances can be effected in a dry state; and my invention consists in subjecting the corn to whipping or beating, whereby the outer glutinous portion of the kernel and the hull are broken into coarse pieces, and the inner starchy portion of the kernel is reduced to flour, and then separating the fragments of glutinous matter and the bran from the starch-flour by suitable sieves or bolts.

In carrying out my process the corn is subjected to whipping or beating in a suitable disintegrating-machine provided with several sets of beaters revolving rapidly in opposite directions. A machine of this class which is very well adapted to this purpose is shown and described in Letters Patent of the United States granted to me January 14, 1879, No. 211,316. The kernels of corn are violently and repeatedly beaten in their passage through the machine, whereby the outer hard glutinous portion of each kernel is broken into coarse fragments, while the inner starchy portion of each kernel, which is much softer than the outer glutinous portion, is reduced to flour. The repeated violent beating to which the material is subjected in its passage through the machine completely detaches and removes the starchy matter from the particles of glutinous matter and the bran and causes the material to be discharged from the machine in a condition in which the starch-flour can be readily and completely separated from the fragments of glutinous matter and the bran. The disintegrated material discharged from the machine is then separated, by one or more suitable sieves or bolts, into three products—starch-flour, fragments of the glutinous part of the kernel, and bran; or, if desired, the fragments of glutinous matter and the bran, after being separated from the starch-flour by bolting, may be subjected to the action of an air-current, whereby the light particles of bran are carried off, leaving the heavy fragments of glutinous matter behind. The starch-flour which is in this manner freed from the gluten and bran may now be worked up for starch, grape-sugar, whisky, or any other desired product, while the glutinous matter, which is entirely freed from starch, may be used as an article of food, either ground or unground, as may be preferred.

When it is desired to ship the products of the separation to distant points, or when the same are required to be stored for a considerable length of time before working them up, they may be subjected to a suitable drying process to expel the moisture originally contained in the grain.

By separating the glutinous matter from the starchy matter before steeping the latter the gluten is prevented from becoming mixed with the starch, as is the case in the ordinary processes now in use, and the grape sugar or sirup manufactured from the starch is produced free from the vegetable oil contained in the gluten which imparts the bitter after-taste to the grape sugar or sirup manufactured in the ordinary manner.

By simply increasing or reducing the speed of the disintegrating-machine the degree of fineness to which the corn is reduced is increased or lessened, thereby enabling the operator to so adjust the operation of the machine that a perfect separation of the glutinous from the starchy matter can be accomplished.

In treating the corn in a disintegrating-machine of the construction shown in my said Letters Patent the large volume of air passing through the machine by reason of the centrifugal force of the rotating beaters keeps the material perfectly cool and prevents the heating and sweating which occur when grinding the corn between stones.

I claim as my invention—

The process of obtaining the glutinous and starchy substances from Indian corn or maize, which consists in whipping or beating the corn until the soft starchy portions of the kernels are reduced to flour, when the tough glutinous portions of the kernels are reduced to coarse fragments, and then separating the fragments of glutinous matter from the starch-flour by suitable sieves or bolts, substantially as set forth.

LEWIS J. BENNETT.

Witnesses:
JNO. J. BONNER,
U. CUMMINGS.